United States Patent
Werth

[11] Patent Number: 5,920,547
[45] Date of Patent: Jul. 6, 1999

[54] TDD METHOD BETWEEN A BASE STATION AND AT LEAST ONE MOBILE STATION

[75] Inventor: Georg Werth, Bochum, Germany

[73] Assignee: Nokia Mobile Phones, Limited, Espoo, Finland

[21] Appl. No.: 08/898,873

[22] Filed: Jul. 23, 1997

[30] Foreign Application Priority Data

Jul. 24, 1996 [DE] Germany .................. 196 29 899

[51] Int. Cl.$^6$ .......................................... H04L 5/14
[52] U.S. Cl. ...................... 370/280; 370/331; 370/468
[58] Field of Search ...................... 370/280, 294, 370/282, 329, 330, 331, 337, 345, 347, 350, 503, 522, 468; 455/511, 509, 517

[56] References Cited

U.S. PATENT DOCUMENTS

| | | | |
|---|---|---|---|
| 5,235,598 | 8/1993 | Sasuta ...................................... | 455/511 |
| 5,239,678 | 8/1993 | Grase et al. .............................. | 455/511 |
| 5,345,448 | 9/1994 | Keskitalo ................................ | 370/95.3 |
| 5,396,653 | 3/1995 | Kivari et al. .............................. | 455/88 |
| 5,410,733 | 4/1995 | Niva et al. ............................... | 455/33.2 |
| 5,428,601 | 6/1995 | Owen ....................................... | 370/330 |
| 5,430,740 | 7/1995 | Kivari et al. ............................. | 371/37.1 |
| 5,483,668 | 1/1996 | Malkamaki et al. ..................... | 455/33.2 |
| 5,524,009 | 6/1996 | Tuutijarvi et al. ...................... | 370/95.3 |
| 5,535,429 | 7/1996 | Bergenlid ................................ | 455/53.1 |
| 5,570,353 | 10/1996 | Keskitalo et al. ...................... | 370/18 |
| 5,577,024 | 11/1996 | Malkamaki et al. ..................... | 370/18 |
| 5,590,400 | 12/1996 | Lopponen ................................ | 455/509 |
| 5,606,548 | 2/1997 | Vayrynen et al. ....................... | 370/252 |

OTHER PUBLICATIONS

"Mobile–funknetze und ihre protokolle" (Mobile Radio Networks And Their Protocols), Chair of Communications Networks, Prof. Dr.–Ing. Bernhard Walke, RWTH Achen, Winter Semester 94/95.

*Primary Examiner*—Chau Nguyen
*Assistant Examiner*—Kenneth Vanderpuye
*Attorney, Agent, or Firm*—Perman & Green, LLP

[57] ABSTRACT

The invention relates to a TDD method between a base station and at least one mobile station using a Logical Control Channel (LCCH) and at least one Traffic Channel (TCH). In order to increase the channel capacity for conversations which are to be carried out, the Logical Control Channel (LCCH) is interrupted, and a further Traffic Channel (TCH) is set up in a time slot assigned to said Logical Control Channel (LCCH). As soon as one of the Traffic Channels (TCH) is switched off again, the Logical Control Channel (LCCH) is set up once again in the time slot of said Traffic Channel (TCH).

5 Claims, 12 Drawing Sheets

TDD METHOD BETWEEN A BASE STATION AND AT LEAST ONE MOBILE STATION

BACKGROUND OF THE INVENTION

The invention relates to a TDD method between a base station and at least one mobile station using a Logical Control Channel LCCH and at least one Traffic Channel TCH.

In the case of Time Division Multiple Access (TDMA) methods, a so-called duplex link, which requires two physical channels, can be set up between a base station and at least one mobile station. It is thus possible for a subcriber to speak and listen at the same time. Time division separation is used in such duplex links, also being referred to as Time Division Duplex (TDD methods). Such a method is generally known, for which purpose reference is made to the document "Mobil-funknetze und ihre protokolle" [Mobile radio networks and their protocols], Chair of Communications Networks, Prof. Dr.Ing. Bernhard Walke, RWTH Achen, Winter Semester 94/95. This could be used, for example, in cordless telephone systems and in mobile radio networks, etc.

Logical control channels (LCCHs) are in general used for transmitting control information for signalling and controlling the system, which is not passed to the subscribers. Typical tasks which can be carried out with the aid of control information are signalling and switching of Traffic Channels, mobility management or access control to radio channels.

Traffic Channels (TCHs) are logical channels via which wanted information is interchanged between subscribers who are maintaining the link. Speech and data are transmitted in digital form and by means of various coding methods.

TDMA systems exist which have only one Traffic Channel in addition to a Logical Control Channel. Thus, for example, an intracell handover is not possible in these systems. An intracell handover occurs when a change in the radio channel takes place within a cell, and thus while maintaining the same base stations. The reason that an intracell handover cannot be carried out in this case is that the Logical Control Channel is still required to transmit signalling information, so that no additional time slot is available for setting up a further Traffic Channel. In addition, it would, of course, not be possible in such a case to set up a second Traffic Channel which could be active at the same time as the already existing Traffic Channel.

The same problem also occurs both in the downlink and in the uplink in TDMA systems having a relatively large number of time slots, to be precise when all the other Traffic Channels in addition to the Logical Control Channel are busy, and a further time slot is nevertheless still required for setting up an additional Traffic Channel.

SUMMARY OF THE INVENTION

The solution to the stated object is specified in the characterizing part of Patent claim 1. Advantageous refinements of the invention can be found in the sub-claims.

A TDD method according to the invention between a base station and at least one mobile station using a Logical Control Channel LCCH and at least one Traffic Channel TCH is distinguished by the fact that the Logical Control Channel is interrupted and is carried out in a time slot assigned to it for setting up a further Traffic Channel.

Such a method can be used in a system in which it is unnecessary to transmit control information continuously when a Traffic Channel is established. A system may be quoted as an example having a base station which has only one external line, so that only one incoming or outgoing call is possible. A further example would be carrying out an intracell handover in a system having a plurality of external services, in which the control channel is disconnected briefly only during the change-over process, as a result of which signalling is only slightly adversely affected.

As a result of the fact that the Logical Control Channel is temporarily disconnected in the TDD method according to the invention, the number of time slots per half frame which are used, for example, to set up Traffic Channels can be increased by 1, so that in the case where no further Traffic Channels are available in relatively small systems, or all the other Traffic Channels are busy in relatively large systems, an intracell handover or setting up a further Traffic Channel, for example, is still possible.

In this case, the further channel in the additional time slot obtained by disconnecting the Logical Control Channel may be at a carrier frequency which differs from the Traffic Channel. Alternatively, it would be possible to use the same carrier frequency in the further Traffic Channel as in the already existing Traffic Channel.

The Logical Control Channel LCCH is set up once again according to the invention in that time slot which is the first to become free after any of the channels has been disconnected. This ensures that the control information is transmitted even if all the Traffic Channels are disconnected.

According to an advantageous refinement of the invention, while the further Traffic Channel TCH is being set up, synchronization signals Synch can be sent on the already existing Traffic Channel TCH, so that in the situation in which there is no conversation in the further Traffic Channel in an intracell handover, it is possible for the system to revert to the already existing Traffic Channel.

After the further Traffic Channel has been set up in the case of the intracell handover, that Traffic Channel on which only the synchronization signals were sent is disconnected. The original Logical Control Channel can now be established there again. If there are a plurality of Traffic Channels, the Logical Control Channel could, of course, also be newly established in that time slot in which an original Traffic Channel is the first to be disconnected after setting up the further Traffic Channel.

According to another refinement of the invention, an already existing Traffic Channel may alternatively remain set up while the further Traffic Channel is being set up, so that it is now possible to carry an additional conversation. As soon as one of the Traffic Channels becomes free, the Logical Control Channel LCCH is newly established in the time slot (or pair of time slots) assigned to it.

BRIEF DESCRIPTION OF THE DRAWING

Exemplary embodiments of the invention will be described in detail in the following text with reference to the drawing, in which.

DETAILED DESCRIPTION OF THE INVENTION

Figure 1:
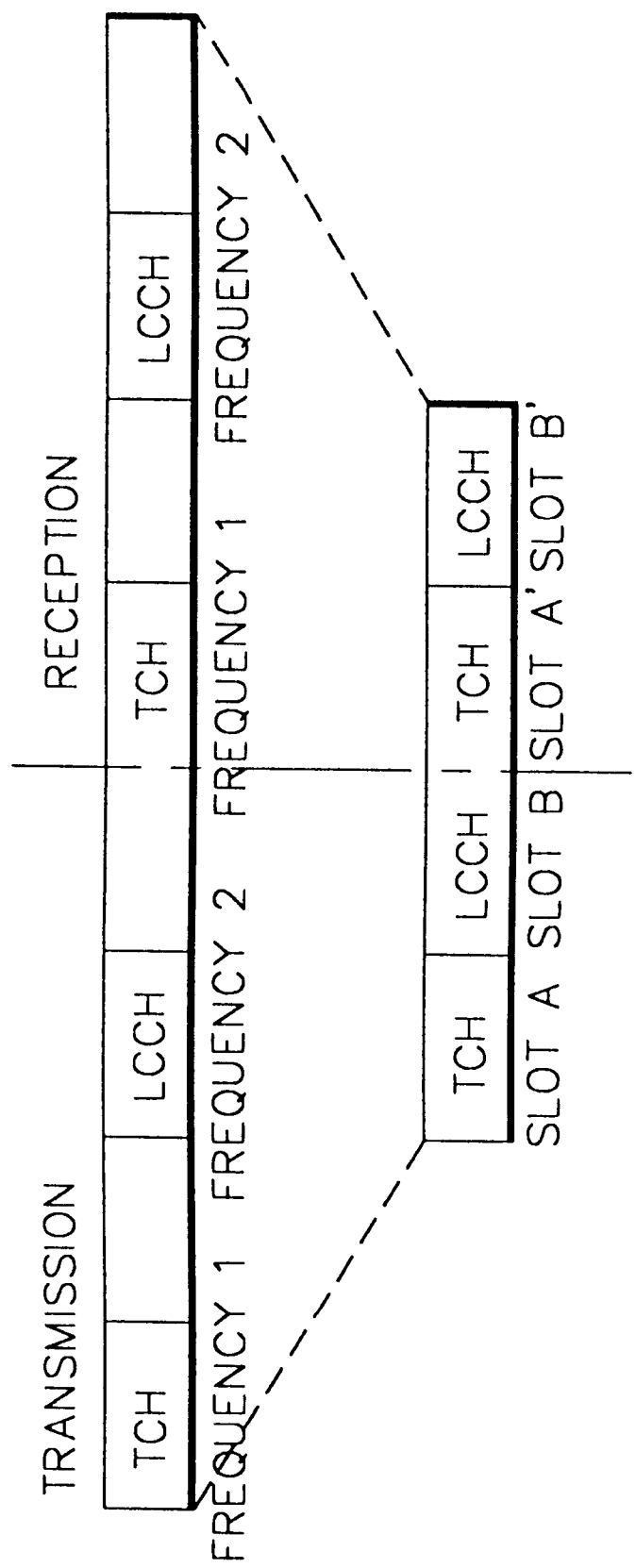
FIG. 1 shows a TDMA system having 8 time slots per frame.

The following text describes a TDMA system with reference to FIG. 1, in which the method according to the invention is used. This TDMA system is used as an example of a system in which the invention can usefully be implemented.

In the case of the TDMA system according to FIG. 1, the frame shown consists of eight time slots. The base station sends data in the first four time slots (downlink), while receiving data from a mobile station, which may be designed, for example, as a mobile telephone, in the following four time slots (uplink).

In the example shown, one time slot in each half frame is assigned to a bidirectional Logical Control Channel LCCH. A further time slot in each half frame is occupied by a bidirectional Traffic Channel TCH, which can also be called a voice channel. Each logical channel is assigned not only a specific time slot, but also a specific frequency. In this case, the traffic channel TCH is transmitted at the carrier frequency F1, while the Logical Control Channel LCCH is transmitted at the carrier frequency F2. Since the Logical Control Channel LCCH and the Traffic Channel TCH are transmitted and received at different frequencies, it is necessary for the transmission frequency (and the reception frequency) to be changed to the frequency F2 after transmitting the Traffic Channel TCH at the frequency F1, in order to allow the Logical Control Channel LCCH to be transmitted. Since a certain amount of time is required for the frequency change from F1 to F2, the Traffic Channel TCH and the Logical Control Channel LCCH cannot be transmitted in adjacent time slots in slow systems. Thus, only two time slots may be used in each half frame.

The system can thus also be described as such a system with four time slots per frame. Data are transmitted in two time slots (slot A and slot B), in this case by the base station, while the base station receives data from a mobile station during the next two time slots (slot A' and slot B').

It should be mentioned at this point that the processes described in the following text always describe the operation of the base, that is to say its transmission operation and its reception operation. Complementary processes take place in a mobile station, but will not be explained in detail here, in order to avoid repetition.

Figure 2:
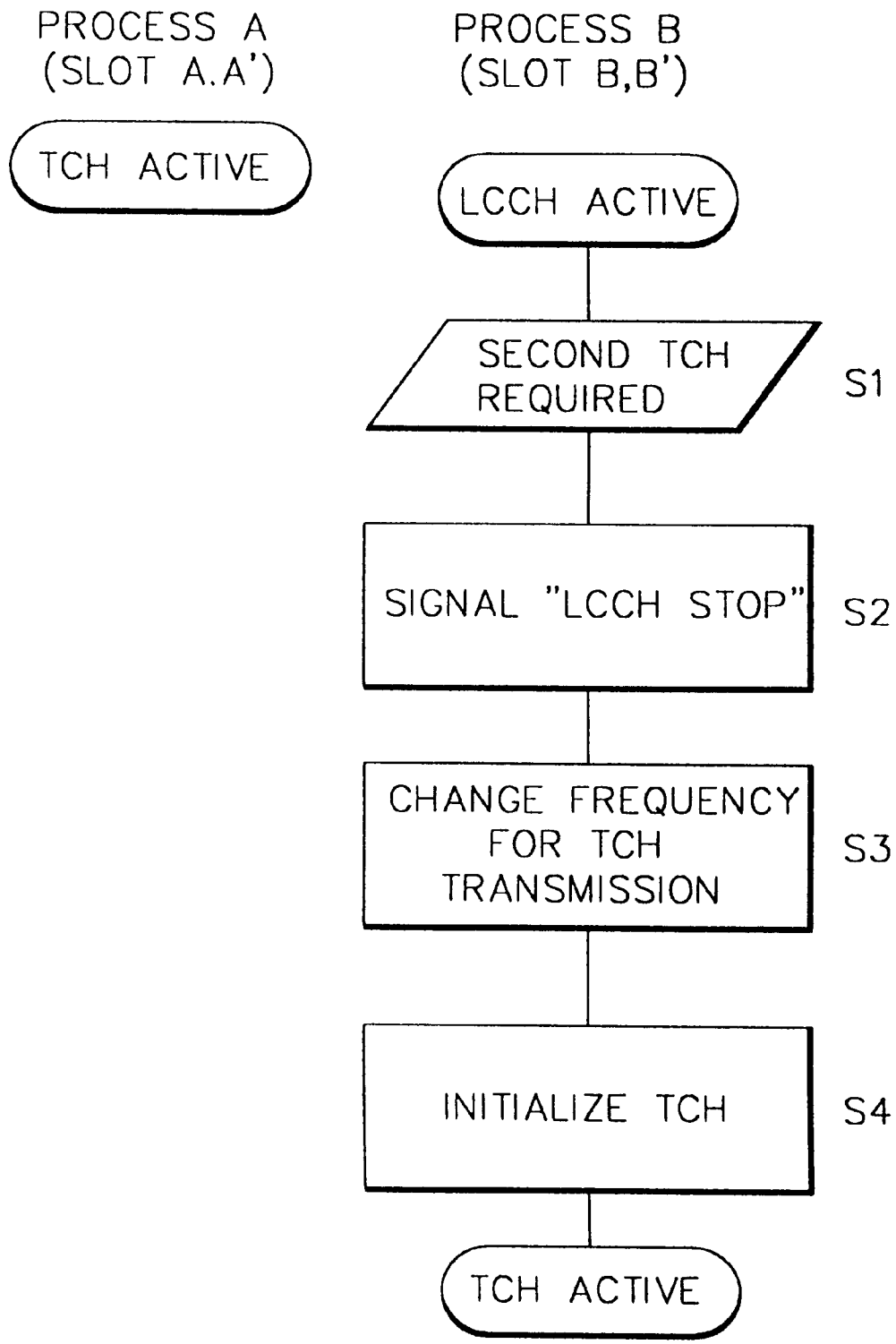
FIG. 2 shows the initialization of a second voice channel.

The following method according to the invention is dependent as an initial condition on a voice link already existing and signalling information being transmitted via a logical control channel LCCH. FIG. 2 roughly describes the temporary setting up of a second Traffic Channel TCH, in that the Logical Control Channel LCCH is temporarily switched off. The time slot assigned to the Logical Control Channel LCCH is thus available for setting up the second Traffic Channel TCH.

Possible applications in a TDMA system could be, for example, an intracell handover or, in the case of a cordless telephone system, setting up an internal call.

Figure 3:
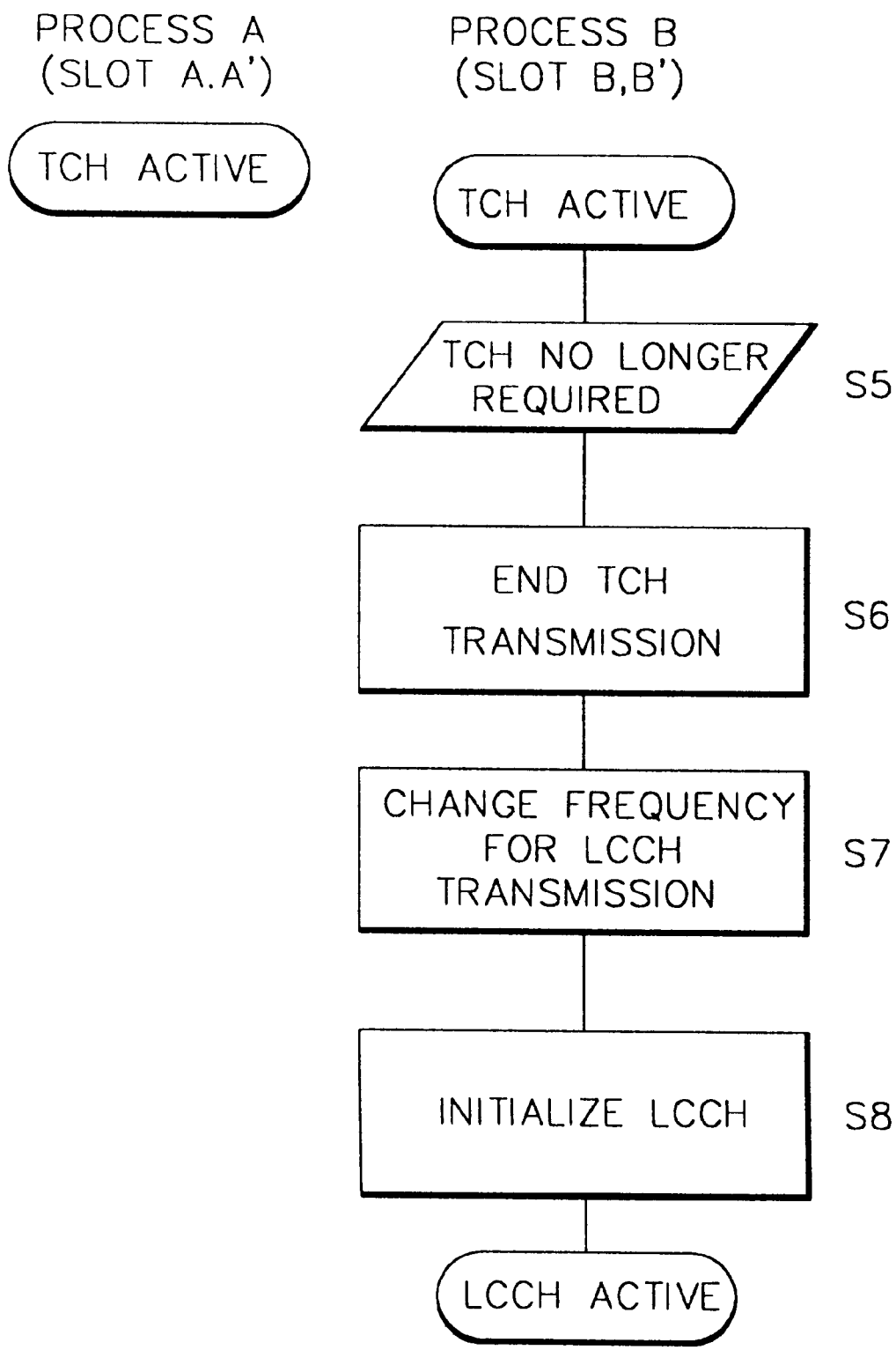
FIG. 3 shows the disconnection of the second voice channel initialized in FIG. 2.

FIG. 3, in contrast, describes the opposite process, in which the previously set up further Traffic Channel is disconnected, and the Logical Control Channel LCCH is activated again in the time slot assigned to said further Traffic Channel.

The states designated in FIGS. 2 and 3 should be understood as states of a specific logic channel of the base station. These include:

LCCH active: The base station transmits LCCH data on the associated Logical Control Channel.

TCH active: The base station transmits TCH data on the associated Traffic Channel.

As can be seen from FIGS. 2 and 3, the process A in the present example leaves the Traffic Channel unchanged. It thus remains continuously active. This means that the base station continuously sends voice data within the frame in the first time slot A, and receives voice information in the third time slot A'.

In contrast, the process B results in a channel change in the second and fourth time slots in the frame according to FIG. 1, that is to say in the slots B and B'. In this case, according to FIG. 2, the Logical Control Channel LCCH is converted into a Traffic Channel TCH, and is subsequently changed into a Logical Control Channel LCCH again, according to FIG. 3.

The states assumed successively by the base station (state process A; state process B) are as follows:

1. (TCH active; LCCH active)→(TCH active; TCH active)

If a second Traffic Channel is required, the LCCH transmission is stopped, and a further Traffic Channel is initialized in the time slot of the Logical Control Channel LCCH which has become free (FIG. 2).

According to FIG. 2, process B thus carries out the following steps S1 to S4 successively, the base station requiring a second Traffic Channel TCH in step S1 and signalling "LCCH stop" in step S2; in step 3, the base station carries out a change in frequency for the TCH transmission, and initializes the Traffic Channel TCH in step 4. After this, it is active.

2. (TCH active; TCH active)→(TCH active; LCCH active)

The further Traffic Channel previously set up is now no longer required and is thus deactivated. The LCCH transmission is started again in the time slot which has become free (slot B, slot B') (FIG. 3).

To this end, the process B carries out steps S5 to S8. First of all, in step S5, the base station confirms that the Traffic Channel TCH is no longer required. It then ends the TCH transmission in step S6. A change in the frequency for the LCCH transmission follows in step S7, while the base station initializes the Logical Control Channel LCCH in step S8. It is then active.

Figure 4:
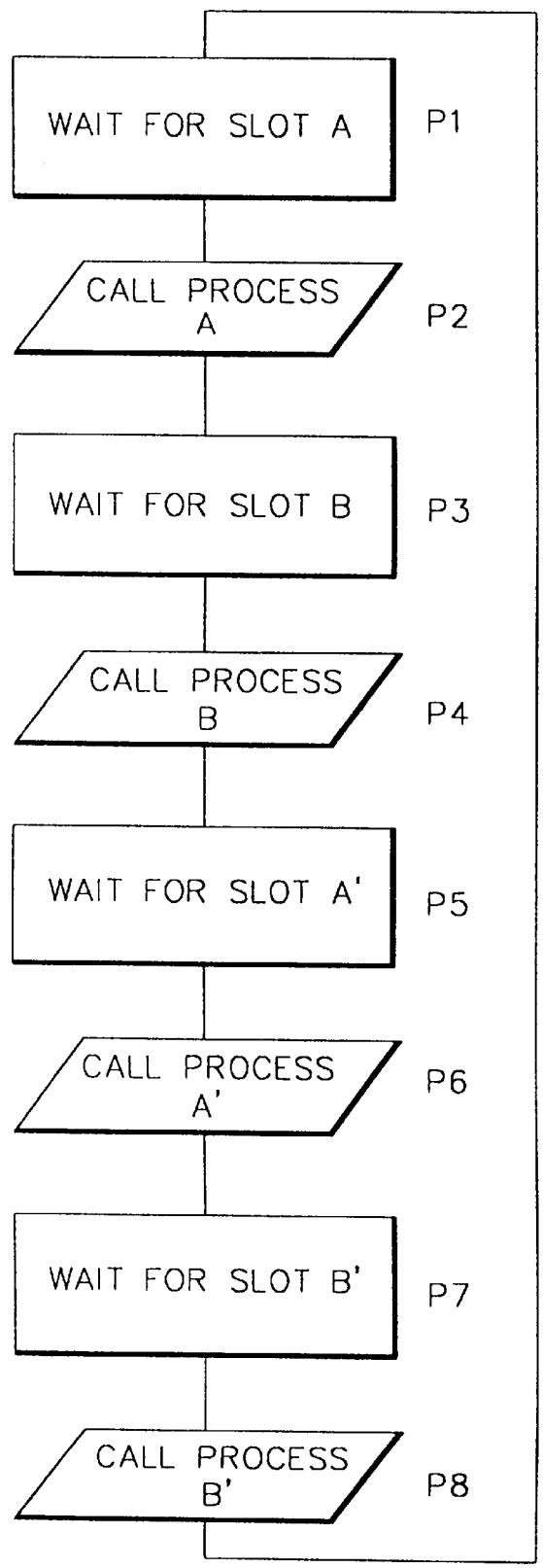
FIG. 4 shows a main control process.
Figure 5:
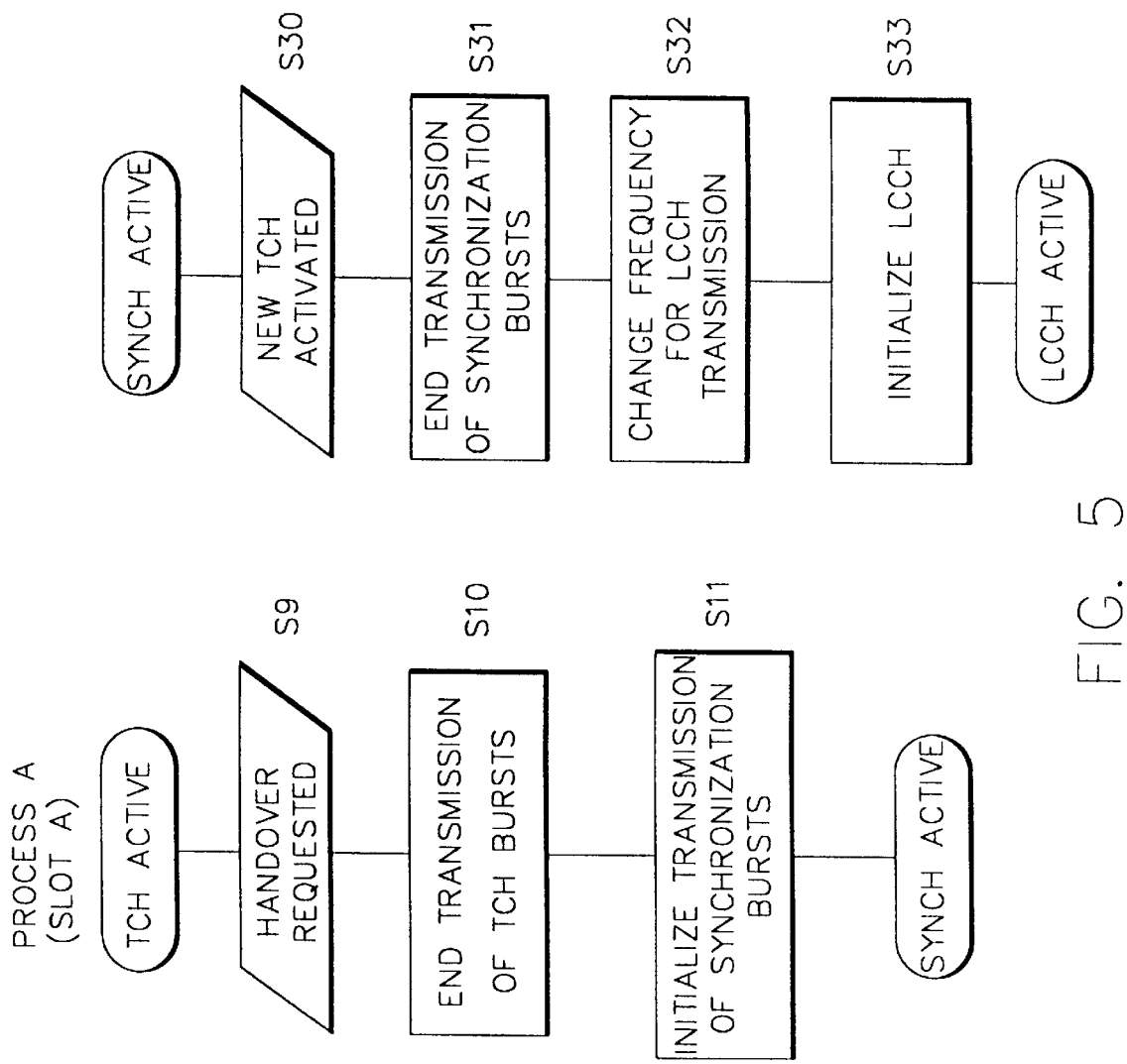
FIGS. 5 to 8 show control processes for an intracell handover, FIG. 5 explaining the control process for a time slot A, FIG. 6 explaining the control process for a time slot A', FIG. 7 explaining the control process for a time slot B, and FIG. 8 explaining the control process for a time slot B'.
Figure 6:
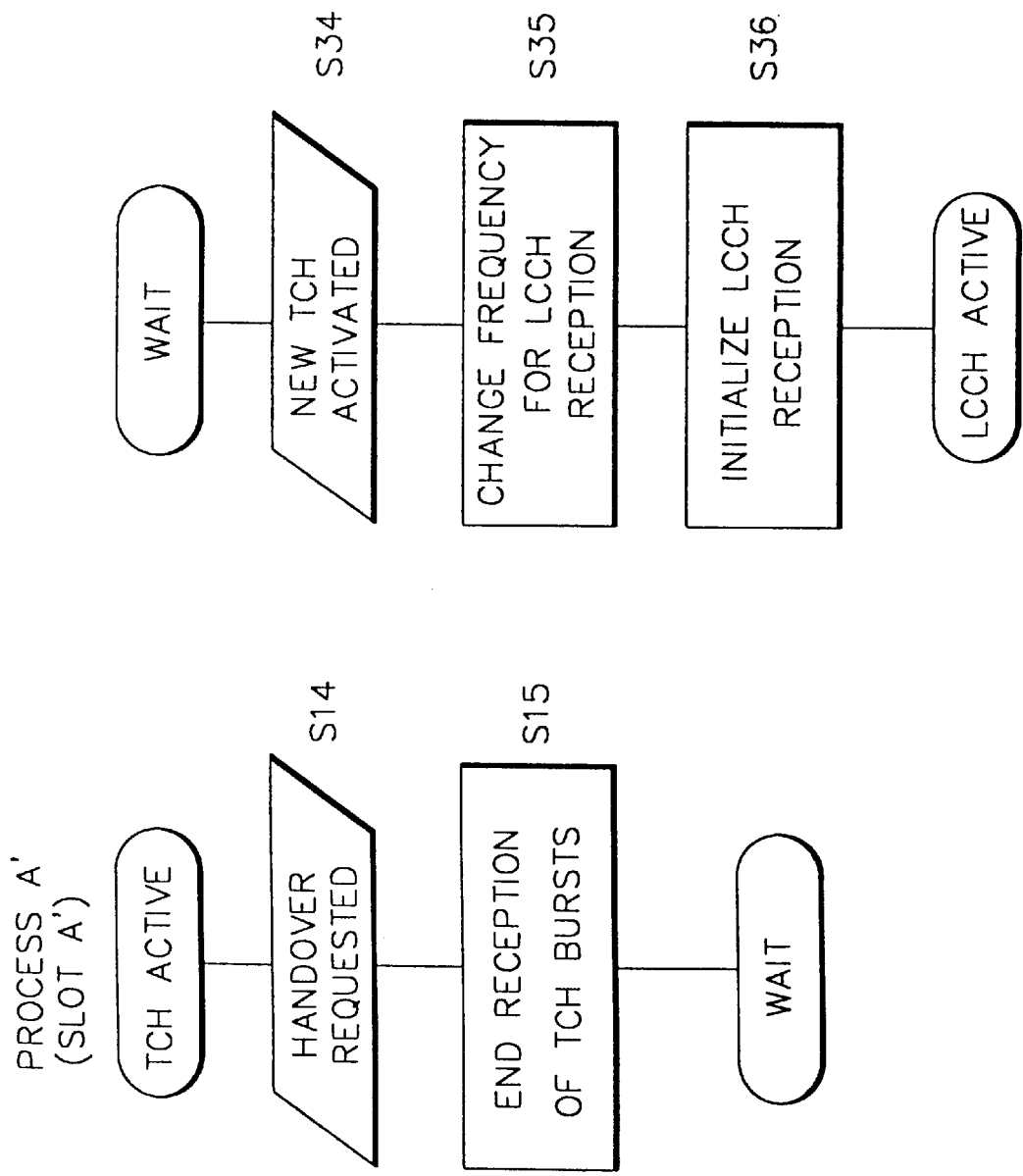
Figure 7:
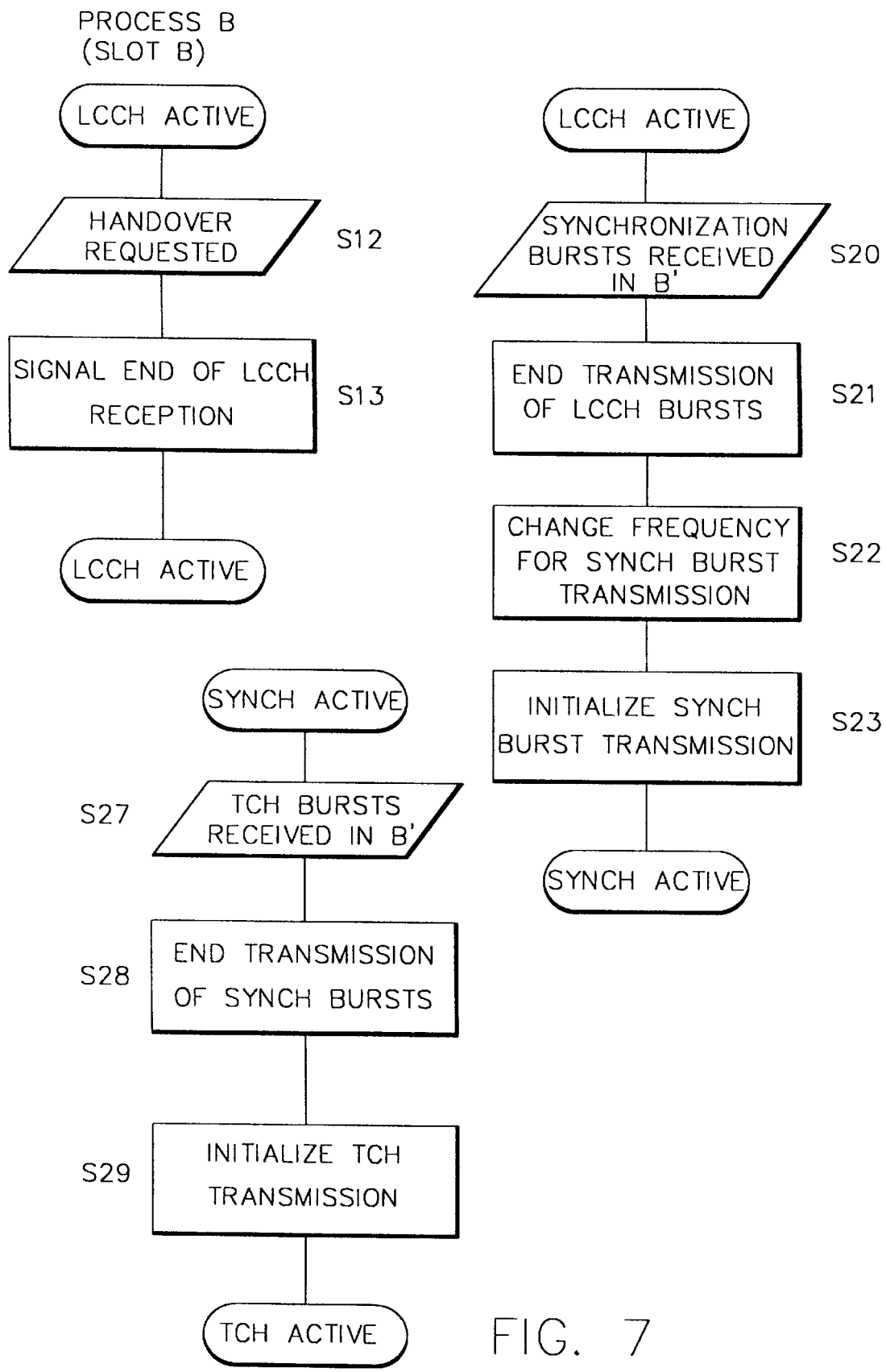
Figure 8:
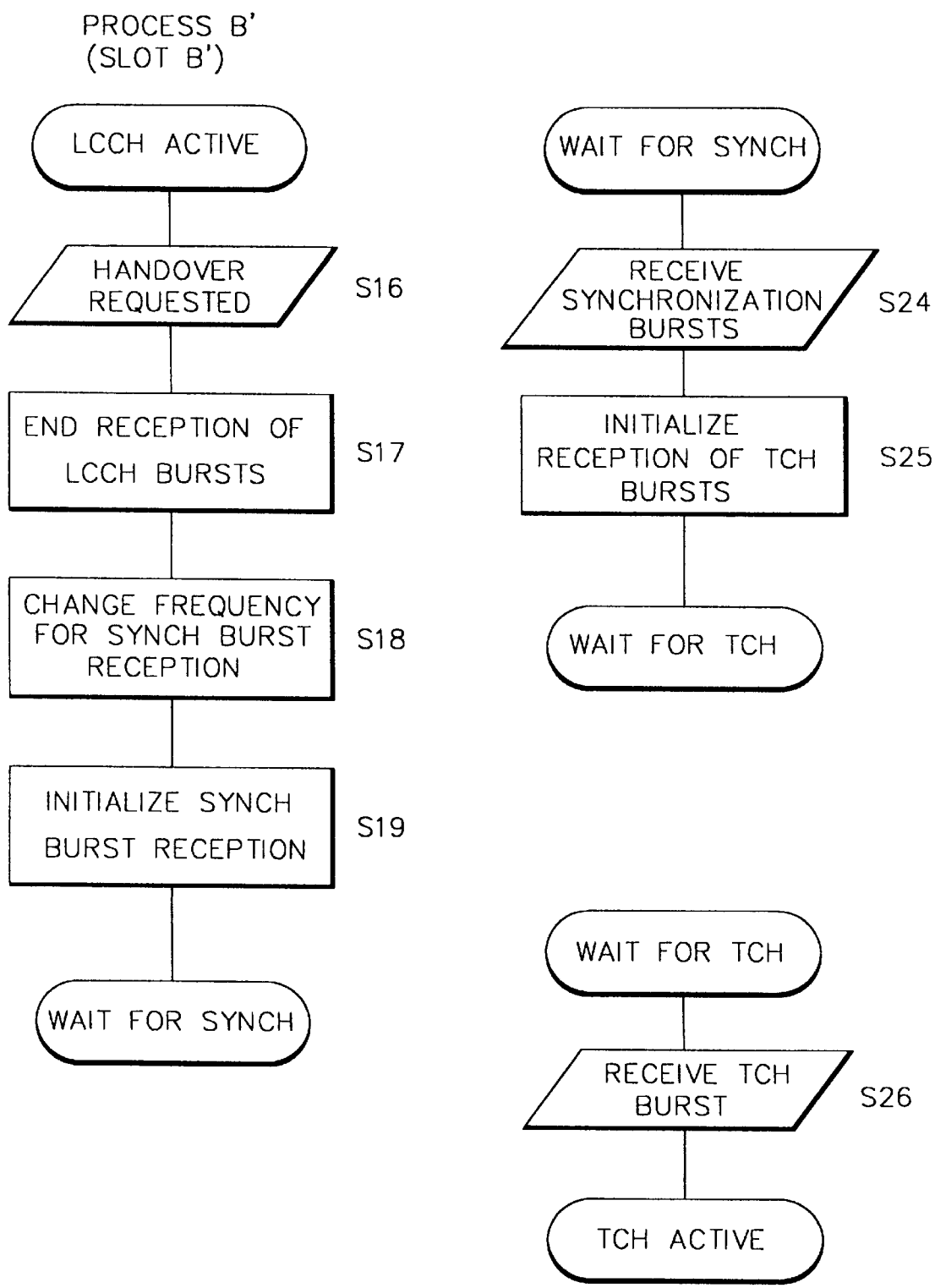

All the steps described above are controlled by the main control procedure shown in FIG. 4. This is carried out by the base station which, for this purpose, carries out steps P1 to P8. First of all, in step P1, the base station waits for the time slot A, while it calls up the process A in step P2. After carrying out the process A, it reaches step P3 and waits for the time slot B. The process B is now processed in step P4. After this, step P5 is reached, in which the base station waits for the time slot A', in order to call up and carry out the process A' in step P6. After this, step P7 is reached, in which the base station waits for the time slot B', in order then to call up and carry out the process B' in step P8. After this, step P1 is reached once again.

Use of the Method for Carrying Out an Intracell Handover

An intracell handover will be described in detail in the following text, with reference to the flowcharts in FIGS. 5 to 8.

The states illustrated in these FIGS. 5 to 8 should be regarded as states of a specific time slot (slot A, slot B, slot A', slot B'). As already mentioned at the start, data are transmitted by the base station in the time slots A and B, and are received from the base station in the time slots A' and B', respectively.

The following states occur:

TCH active: The base station transmits and receives TCH data in the associated time slot.

LCCH active: The base station transmits and receives LCCH data in the associated time slot.

Synch active: The base station transmits and receives synchronization bursts in the associated time slot.

Wait: The base station does not transmit or receive any data in the associated time slot.

Wait for Synch: The base station waits until it receives synchronization bursts in the associated time slot.

Wait for TCH: The base station waits until it receives TCH data in the associated time slot.

The state transitions will be described in the following text. In this case, process A is assigned to the time slot A, process A' to the time slot A', process B to the time slot B, and process B' to the time slot B'. The state of the base station is defined by the state of the processes A, A', B and B'. This state is characterized as follows:

(State Process A, State Process A'; State Process B, State Process B')

State transitions when carrying out an intracell handover are as follows:

1. (TCH active, TCH active; LCCH active, LCCH active) →(Synch active, wait; LCCH active, wait for Synch)

A handover has been requested. The base station has signalled the new channel to the mobile section e.g. portable telephone. It should be in the same time slot as the Logical Control Channel LCCH. The base station ends the transmission and the reception of TCH bursts, and now transmits synchronization bursts in the time slot A. It likewise ends the reception of LCCH data, and waits for the reception of synchronization bursts in the same time slot.

Thus, in accordance with process A for the time slot A, a handover is requested in step S9, after which the transmission of TCH bursts is ended, in step S10. The base station now initializes the transmission of synchronization bursts in step S11.

In the next process B, for time slot B, the handover is requested in step S12, the end of LCCH reception being signalled in the next step S13. However, LCCH data are still transmitted by the base station.

In process A' for the slot A', the handover is requested in step S14, while the base station ends the reception of TCH bursts in the next step S15. After this, it goes to the waiting state.

In contrast, in process B' for the time slot B', the handover is requested in step S16, after which the reception of LCCH bursts is ended in step S17. The base station then changes the frequency, in step S18, for reception of synchronization bursts. After this, in step S19, it initializes the reception of synchronization bursts. After this, it waits for the synchronization bursts from the mobile station.

2. (Synch active, wait; LCCH active, wait for Synch)→ (Synch active, wait; Synch active, wait for TCH)

The base station has received synchronization bursts and now transmits synchronization bursts in the time slot B in order to report to the mobile section that it has received synchronization bursts in the time slot B'. It waits for the reception of TCH data in the time slot B', this data being transmitted by the mobile section after reception of synchronization bursts.

In other words, process B for the time slot B passes through steps S20 to S23, step S20 confirming that the base station has received synchronization bursts in the time slot B'. The transmission of LCCH bursts is ended in step S21, while, in step S22, the base station changes the frequency for transmitting the synchronization bursts. After this, the transmission of synchronization bursts is initialized in step S23, after which synchronization bursts are transmitted.

According to process B' for the time slot B', the base station receives, in step S24, synchronization bursts coming from the mobile section. After this, in step S25, the base station initializes the reception of TCH bursts. It then changes to the waiting state.

3. (Synch active, wait; Synch active, wait for TCH)→(Synch active, wait; TCH active, TCH active)

The base station now receives TCH data, and now also transmits this data to the mobile section.

The reception of the TCH data takes place in step S26, controlled by the process B' for the time slot B', while the base station confirms in step S27 that TCH data have been received in the time slot B'. The base station ends the transmission of synchronization bursts in step S28, while, in step S29, it initializes the TCH transmission. After this, TCH data are transmitted.

4. (Synch active, wait; TCH active, TCH active)→(LCCH active, LCCH active; TCH active, TCH active)

The LCCH channel is set up again over the time slots A, A'. In contrast, the TCH channel is active in the time slots B, B'.

In detail, the process A for the time slot A passes through the further steps S30 to S33, confirmation being obtained in step S30 that the new TCH channel is activated. The transmission of synchronization bursts is ended in step S31, while the frequency for the LCCH transmission is changed in step S32. After this, LCCH transmission is initialized, and is subsequently active.

The process A' for the time slot A' in this case passes through steps S34 to S36, confirmation being obtained in step S34 that a new TCH has been activated. The frequency is changed in step S35 for LCCH reception, while LCCH reception is initialized in step S36. After this, the Logical Control Channel LCCH is active.

Figure 9:
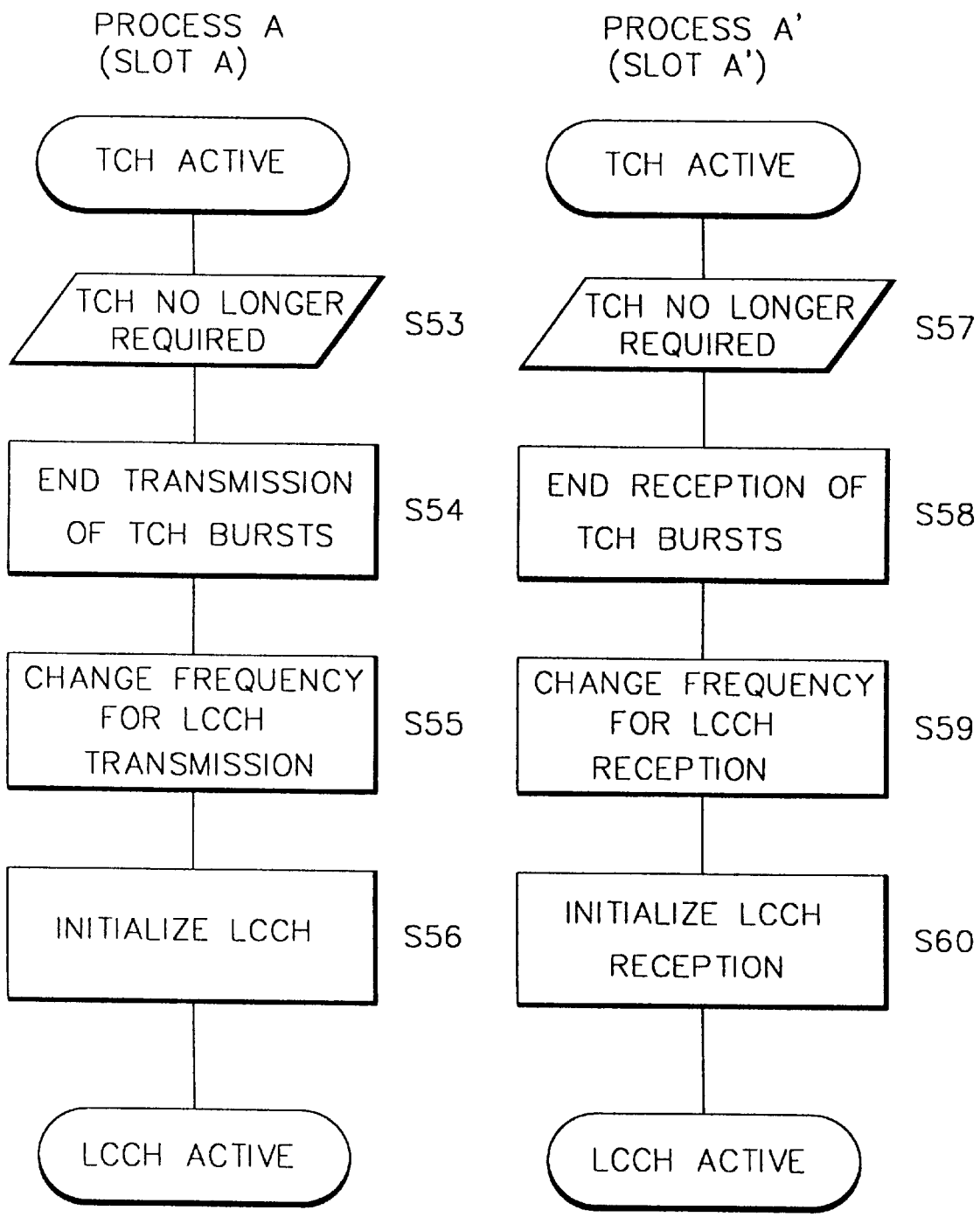
FIGS. 9 to 11 show a control process for setting up a second voice channel, FIG. 9 explaining the process for the time slots A and A', FIG. 10 explaining the process for the time slot B, and FIG. 11 explaining the process for the time slot B'.
Figure 10:
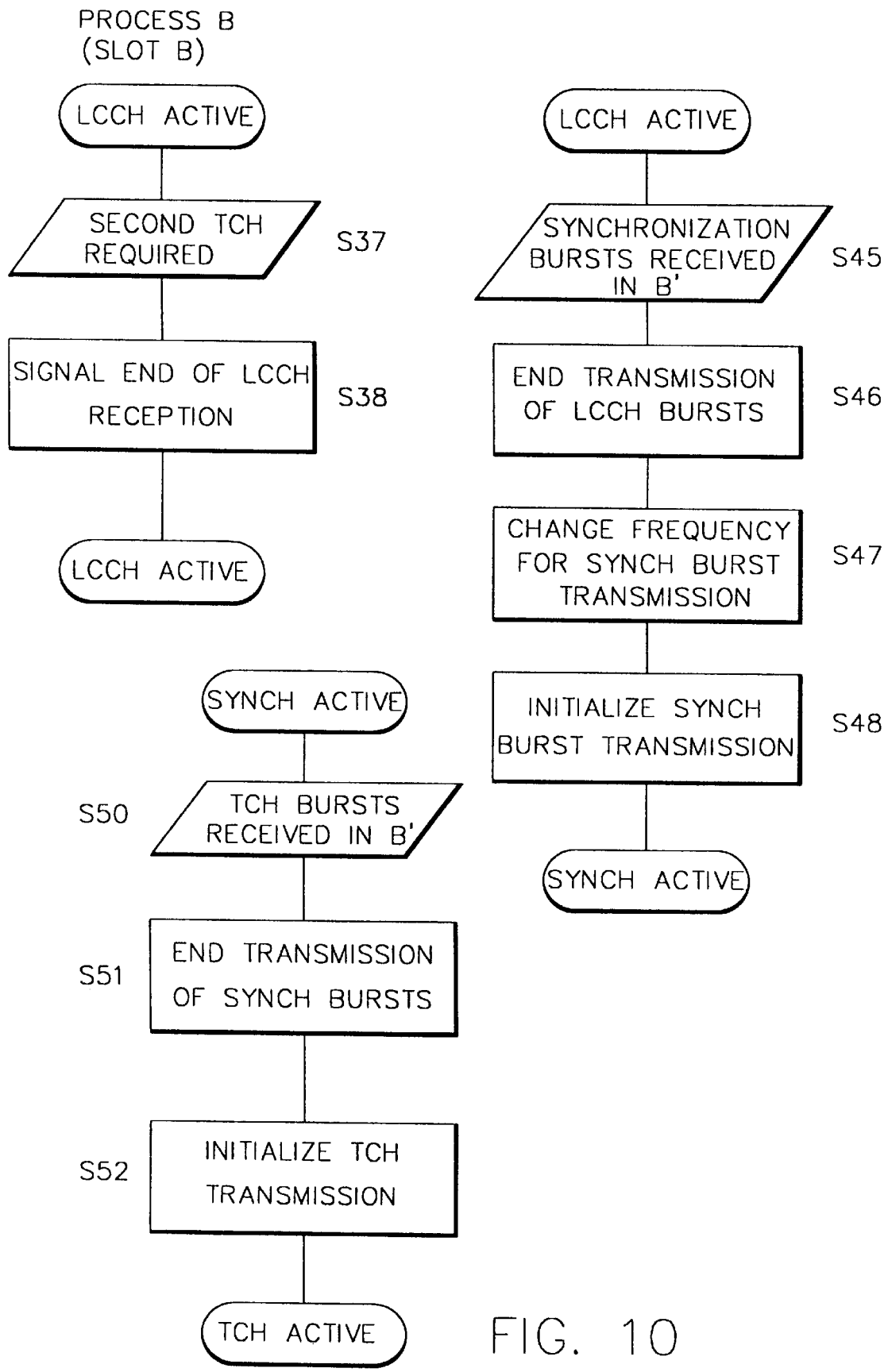
Figure 11:
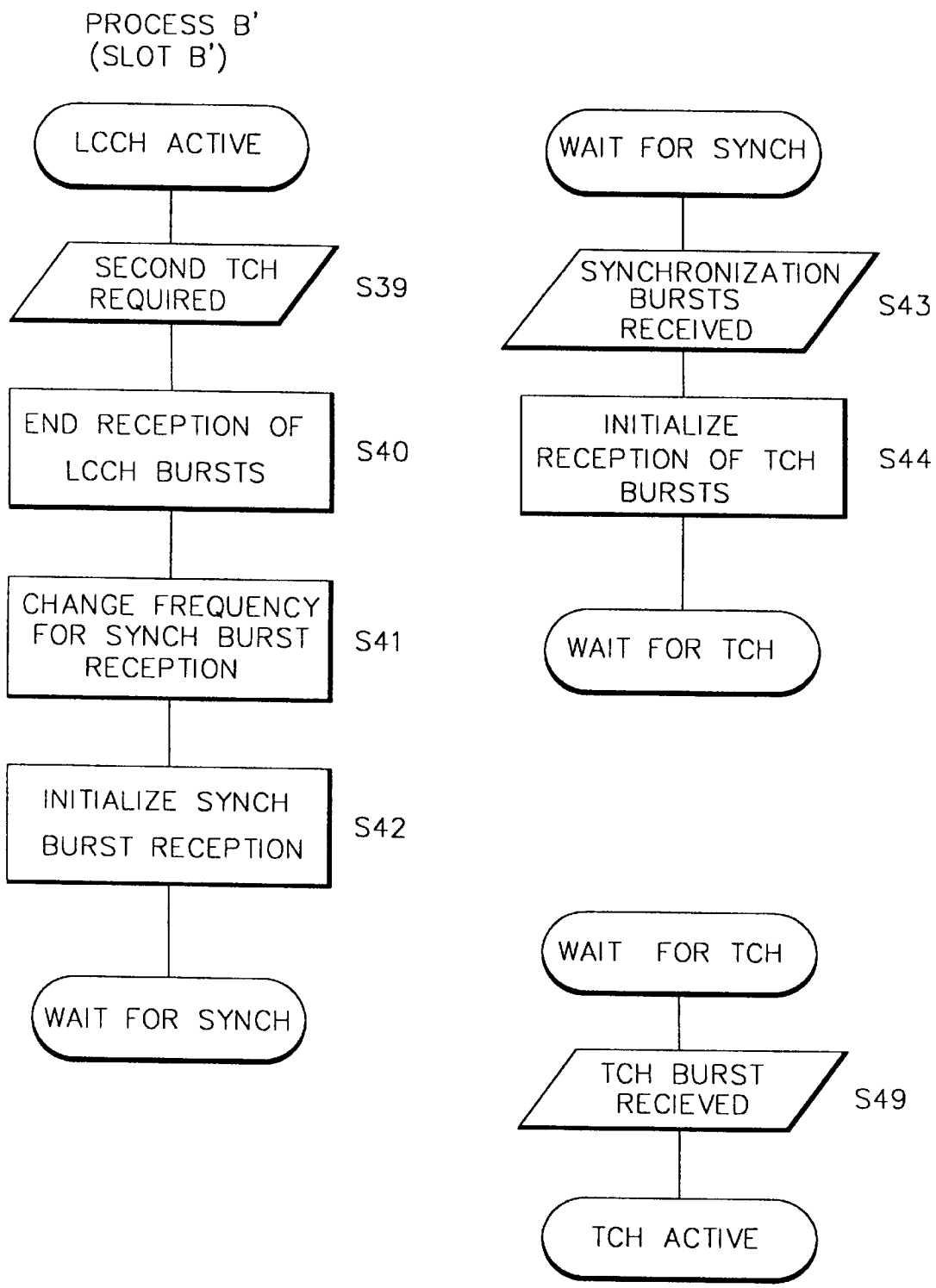

Use of the Method According to the Invention for Setting Up Two Traffic Channels The following processes A, A', B and B' are used for temporarily setting up a second voice channel. In this case, they are once again assigned to the time slots A, A', B and B'. In detail, FIGS. 10 and 11 relate to setting up a second Traffic Channel, while FIG. 9, for the time slots A and A', relates to the Logical Control Channel LCCH being set up again after the end of TCH connection.

The states quoted further below should be regarded as states of a specific time slot (slot A, slot B; slots A', B') . In this case, data are transmitted from the base station in the time slots A and B, while data are received by the base station in the time slots A' and B'. The following states occur:

| | |
|---|---|
| TCH active: | The base station transmits and receives TCH data in the associated time slot. |
| LCCH active: | The base station transmits and receives LCCH data in the associated time slot. |
| Synch active: | The base station transmits and receives synchronization bursts in the associated time slot. |
| Wait for Synch: | The base station waits until it receives synchronization bursts in the associated time slot. |
| Wait for TCH: | The base station waits until it receives TCH data in the associated time slot. |

As already mentioned, process A is assigned to the time slot A, process A' to the time slot A', process B to the time slot B, and process B' to the time slot B'. The state of the base station can thus be represented as follows:
State Process A, State Process A'; State Process B, State Process B')

The following state transmissions are passed through when setting up a second voice channel:

1. (TCH active, TCH active; LCCH active, LCCH active) →(TCH active, TCH active; LCCH active, wait for Synch)

First of all, a second Traffic Channel is requested. The base station signals the new Traffic Channel, which must be located in the same time slot as the LCCH. It ends the transmission of LCCH information and waits for reception of synchronization bursts.

In detail, process B for the time slot B passes through steps S37 and S38. Confirmation is obtained in step S38 that a second TCH channel has been requested, while in contrast the end of LCCH reception is signalled in step S38.

In contrast, process B' for the time slot B' passes through steps S39 to S42. Confirmation is obtained in step S39 that a second TCH channel has been requested. Reception of LCCH bursts is then ended in step S40. In step S41, the base station now changes the frequency for synchronization burst reception. In step S42, the base station initializes synchronization burst reception, and then waits for synchronization bursts.

2. (TCH active, TCH active; LCCH active, wait for Synch) →(TCH active, TCH active; Synch active, wait for TCH)

Synchronization bursts have been received from the base station. The base station responds to reception of synchronization bursts by transmitting synchronization bursts. In detail, process B' in this case passes through steps S43 and S44. In step S43, the synchronization bursts are received by the base station while, in contrast, in step S44, the base station initializes the reception of TCH bursts. It then waits for TCH bursts.

Process B passes through steps S45 to S48. Confirmation is obtained in step S45 that synchronization bursts have been received in slot B'. The base station now ends the transmission of LCCH bursts in step 46 and, in step S47, changes the frequency for synchronization burst transmission. In step S48, the base station initializes the synchronization burst transmission, and then transmits the synchronization bursts.

3. (TCH active, TCH active; Synch active, wait for TCH) →(TCH active, TCH active; TCH active, TCH active)

The base station has now received TCH data and now likewise transmits TCH data on the second Traffic Channel. Two Traffic Channels are thus active.

In detail, process B' passes through step S49, in which the base station confirms that it is receiving TCH bursts.

Process B passes through steps S50 to S52. Confirmation is obtained in step S50 that the base station has received TCH bursts in the time slot B'. The base station ends the transmission of synchronization bursts in step S51, and initializes the TCH transmission in step S52. The TCH channel is thus active.

4. (TCH active, TCH active; TCH active, TCH active)→ (LCCH active, LCCH active; TCH active, TCH active)

Once a channel is no longer required, the LCCH channel is now set up again, to be precise now in the time slots A and A'.

In detail, the process A for the slot A passes through steps S53 to S56. In step S53, the base station confirms that the Traffic Channel TCH is no longer required. It ends the transmission of TCH bursts in step S54 and changes the frequency for LCCH transmission in step S55. The Logical Control Channel LCCH is initialized in step S56, and is then active.

In contrast, the process A' for the time slot A' passes through steps S57 to S60. Confirmation is once again obtained in step S57 that the Traffic Channel TCH is no longer required. The base station thus ends the reception of TCH bursts in step S58, and changes the frequency for LCCH reception in step S59. After this, LCCH reception is initialized in step S60, and is then active.

Figure 12:
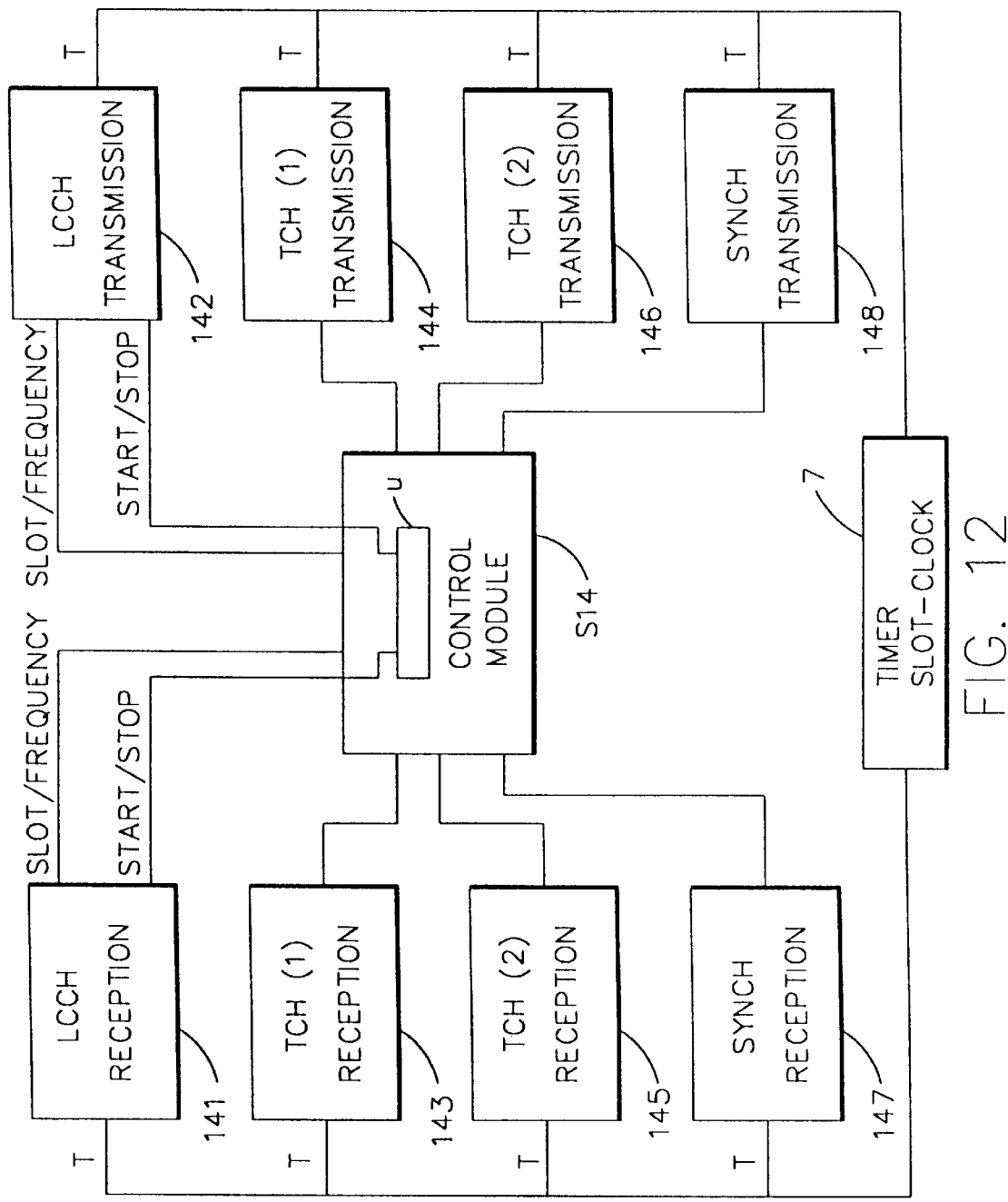
FIG. 12 shows a schematic layout of a base station for carrying out the method according to the invention.

In the following text, the design of the base station is explained in more detail, in terms of transmission/reception control, with reference to FIG. 12.

The transmitting and receiving unit of the base station is split into modules in the block diagram shown. In this case, the transmission and reception of the various types of data packets are carried out by separate modules M1 to M8. Each of these modules M1 to M8 has the task of transmitting and receiving data packets of the associated type. This is done using an externally preset clock T, which is produced by a timer 7. Each of the modules M1 to M8 can be activated and deactivated. It is also possible to select the associated logical channel, which is defined by a specific frequency and a time slot. The following modules are available:

the "LCCH reception" module M1, which is responsible for reception and processing of LCCH data packets;

the "LCCH transmission" module M2, which is responsible for transmission of LCCH data packets;

the "TCH reception" module M3, which is responsible for reception and processing of TCH data packets;

the "TCH transmission" module M4, which is responsible for transmission of TCH data packets;

the "TCH reception" module M5, which is responsible for reception and processing of TCH data packets;

the "TCH transmission" module M6, which is responsible for transmission of TCH data packets;

the "Synch reception" module M7, which detects synchronization bursts which are received at a predetermined frequency in a predetermined time slot; and the "Synch transmission" module M8, which transmits synchronization bursts, to be precise at an adjustable frequency in a time slot which can likewise be selected.

A "ITCH transmission" module and a "TCH reception" module respectively control the transmission and reception of TCH data packets on a single channel. If the base station is able to control more than one Traffic Channel, then separate transmission and reception modules are required for each of these channels. In the illustrated example, two Traffic Channels TCH (1) and TCH (2), can be set up.

A control module SM controls the individual transmission and reception modules M1 to M8. To this end, it assigns a specific frequency and a time slot to the individual modules M1 to M8. In this case, the control module SM is able to activate and deactivate individual channels. For this purpose, the control module SM is connected to the individual transmission and reception modules via start/stop control lines which, for clarity, are connected only to the modules M1 and M2 in FIG. 12. A corresponding situation applies to the other modules. A changeover device U of the control module SM allows an LCCH channel to be disconnected temporarily and a changeover to be made to a second TCH channel which is then operated in the same time slot as that which was previously used for LCCH operation. The control module SM is thus able to carry out the procedures described further above for implementing a handover or temporarily setting up a second traffic channel.

What is claimed is:

1. TDD method between a base station and at least one mobile station using a logical Control Channel (LCCH) and at least a first traffic channel (TCH), wherein the Logical Control Channel (LCCH) is interrupted and is carried out in a time slot (B, B') assigned to it for setting up a further Traffic Channel (TCH), and synchronization signals (Synch) are sent on the first Traffic Channel (TCH) while the further Traffic Channel (TCH) is being set up.

2. TDD method according to claim 1, wherein the further Traffic Channel (TCH) is at a carrier frequency that differs from a carrier frequency of the first Traffic Channel (TCH).

3. TDD method according to claim 1, wherein the Logical Control Channel (LCCH) is set up once again in that time slot which is the first to become free by switching off any of the channels (TCH, TCH).

4. TDD method according to claim 1, wherein the Traffic Channel (TCH) is switched off after the further Traffic Channel (TCH) has been set up.

5. TDD method according to claim 1, wherein the first Traffic Channel (TCH) remains set up while the further Traffic Channel (TCH) is being set up.

* * * * *